(12) United States Patent
Andre

(10) Patent No.: US 6,637,779 B2
(45) Date of Patent: Oct. 28, 2003

(54) FLUID QUICK CONNECTOR WITH GROOVED ENDFORM

(75) Inventor: Michael J. Andre, Waterford, MI (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 0 days.

(21) Appl. No.: 09/982,422

(22) Filed: Oct. 18, 2001

(65) Prior Publication Data

US 2003/0075922 A1 Apr. 24, 2003

(51) Int. Cl.[7] .................................................. F16L 37/00
(52) U.S. Cl. ........................................ 285/305; 285/328
(58) Field of Search ................................ 285/328, 305, 285/321, 316

(56) References Cited

U.S. PATENT DOCUMENTS

| | | | | |
|---|---|---|---|---|
| 4,244,608 A | | 1/1981 | Stuemky | |
| 4,368,904 A | * | 1/1983 | Lanz | ...................... 285/149.1 |
| 4,423,891 A | * | 1/1984 | Menges | ...................... 285/305 |
| 4,561,682 A | * | 12/1985 | Tisserat | ...................... 285/305 |
| 4,723,796 A | * | 2/1988 | Nattel | ...................... 285/140.1 |
| 5,226,682 A | | 7/1993 | Marrison et al. | |
| 5,310,226 A | * | 5/1994 | Norkey | ...................... 285/316 |
| 5,542,716 A | | 8/1996 | Szabo et al. | |
| 5,727,821 A | | 3/1998 | Miller | |
| 5,730,481 A | | 3/1998 | Szabo et al. | |
| 5,758,909 A | * | 6/1998 | Dole et al. | ...................... 285/305 |
| 5,765,877 A | * | 6/1998 | Sakane et al. | ................. 285/93 |
| 5,782,502 A | | 7/1998 | Lewis | |
| 5,860,677 A | | 1/1999 | Martins et al. | |
| 5,863,077 A | | 1/1999 | Szabo et al. | |
| 6,089,620 A | | 7/2000 | Mota Lopez et al. | |
| 6,290,263 B1 | * | 9/2001 | Murken | ...................... 285/13 |
| 6,464,263 B1 | * | 10/2002 | Schwarz et al. | ............. 285/305 |
| 6,474,696 B1 | * | 11/2002 | Canale | ...................... 285/7 |

* cited by examiner

Primary Examiner—Eric K. Nicholson
(74) Attorney, Agent, or Firm—Young & Basile, P.C.

(57) ABSTRACT

A fluid quick connector includes a connector body which receives a retainer having a radially inward extending projection which is releasably engagable with an annular recess formed in an endform to releasably latch the endform in the connector body.

19 Claims, 3 Drawing Sheets

US 6,637,779 B2

FLUID QUICK CONNECTOR WITH GROOVED ENDFORM

BACKGROUND OF THE INVENTION

The present invention relates, in general, to fluid quick connectors which couple male and female connector components.

Snap-fit or quick connectors are employed in a wide range of applications, particularly, for joining fluid carrying conduits in automotive and industrial application. Such quick connectors utilize retainers or locking elements for securing a male connector component, such as a tubular conduit, within a complimentary bore of a female connector component or housing. Such retainers are typically of either the axially-displaceable or radially-displaceable type. The terms "axially-displaceable" or "radially-displaceable" are taken relative to the axial bore through the female component.

In a typical quick connector with an axially displaceable retainer, the retainer is mounted within a bore in a housing of the female connector component of housing. The retainer has a plurality of radially and angularly extending legs which extend inwardly toward the axial center line of the bore in the housing. A tube or male component to be sealingly mounted in the bore in the female component includes a radially upset portion or flange which abuts an inner peripheral surface of the retainer legs. Seal and spacer members as well as a bearing or top hat are typically mounted in the bore ahead of the retainer to form a seal between the housing and the male fitting when the male fitting is lockingly engaged with the retainer legs in the housing.

Radially displaceable retainers are also known in which the retainer is radially displaceable through aligned bores or apertures formed transversely to the main throughbore in the female component housing. The radially displaceable retainer is typically provided with a pair of depending legs which are sized and positioned to slip behind the radially upset portion or flange on the male conduit only when the male connector or conduit is fully seated in the bore in the female component. This ensures a positive locking engagement of the conduit with the female component as well as providing an indication that the conduit is fully seated since the radially displaceable retainer can be fully inserted into the female component only when the conduit has been fully inserted into the bore in the female component.

The above described fluid quick connectors use a male component or endform which meets SAE standards in terms of the raised bead height, depth, etc.

Other quick connectors utilize retainers designed to lockingly engage beadless endforms. Such retainers are typically in the form of an annular clip with a plurality of radially inward extending, flexible fingers, which engage the endform at an angle to resist pullout of the endform from the connector housing.

While such fluid quick connectors have found widespread use in fluid handling applications, it is believed that a new style of fluid quick connector will provide additional advantages compared to such prior fluid quick connectors.

Thus, it would be desirable to provide a fluid quick connector which provides a visible indication of a fully inserted endform into the connector housing. It would also be desirable to provide a fluid quick connector in which the endform cannot be fully inserted into the housing when the retainer is in the fully latched position in the housing. It would also be desirable to provide a fluid quick connector which has an easier to make and less expensive endform design.

SUMMARY OF THE INVENTION

Generally, the present invention is a fluid quick connector having a unique retainer and endform configuration for releasably latching the endform in the connector body.

In one aspect, the fluid quick connector includes a connector body configured to axially mate with a tubular endform having a groove or recess adjacent a first end, the first end of the endform insertable into the connector body, and a retainer transversely displaceable with respect to the connector body between a release position and an engaged position with the body and the tubular endform. The retainer has an inward extending projection engagable with the recess in the tubular endform to effect interlocking between the connector body and the tubular endform when the retainer is in the engaged position.

In one aspect, the recess is an annular groove in the endform. The groove has a radially inward end of a smaller diameter than the outer diameter of the endform. The projection on the retainer may extend up to substantially 180° around the retainer. Further, the projection can be formed of one or more arcuate continuous or discontinuous segments.

The projection on the retainer and the recess in the endform are complementary shaped for releasable interlocking only when the endform is fully inserted into the bore in the connector body.

The fluid quick connector of the present invention provides a unique retainer and endform configuration which reduces manufacturing costs of the endform since the endform does not have to meet current SAE standards for the conventional fluid quick connectors with an endform having a raised flange. Further, most existing retainers can be employed with only minor modifications necessary to implement the radially inward extending projection. At the same time, the inventive fluid quick connector provides all of the standard fluid quick connector functions of sealing engagement of the endform in the connector body, high endform pullout retention forces, and a visual indication of a non-fully inserted endform position in the connector body.

BRIEF DESCRIPTION OF THE DRAWING

The various features, advantages and other uses of the present invention will become more apparent by referring to the following detailed description and drawing in which.

DETAILED DESCRIPTION

Figure 1:
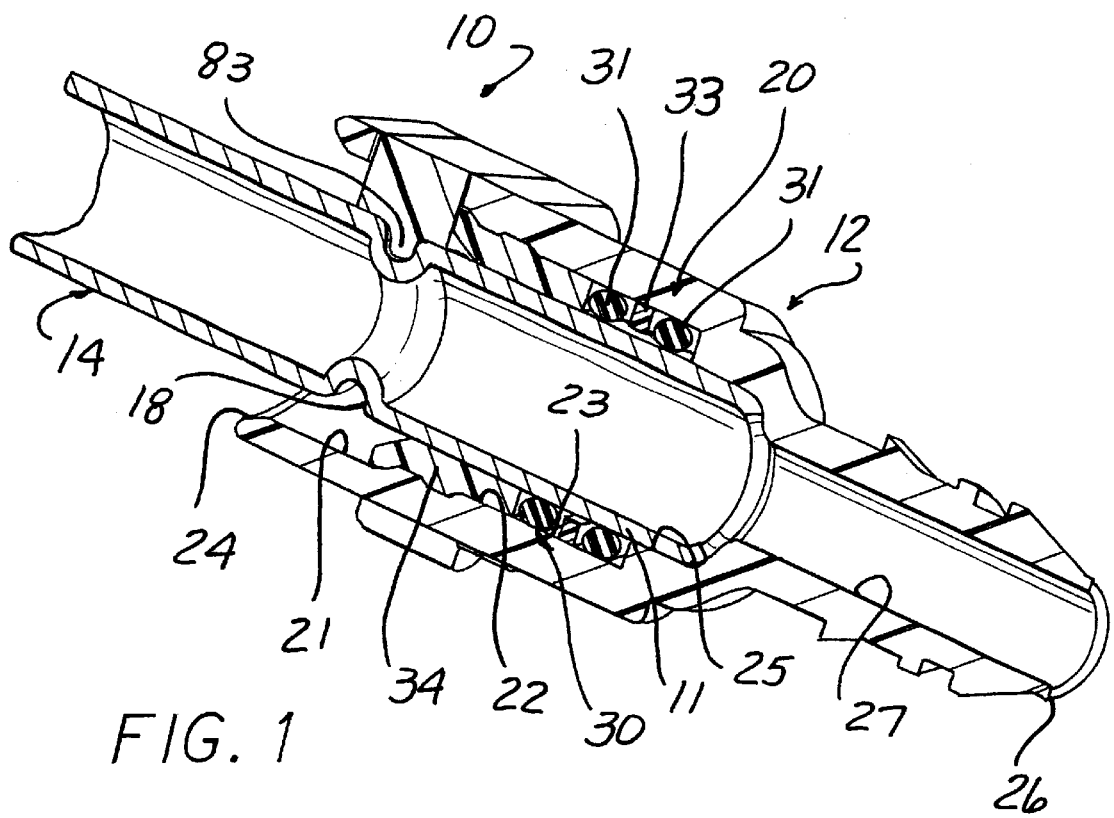
FIG. 1 is a longitudinal cross sectional view of a fluid quick connector having an endform and retainer design according to the one aspect of the present invention.
Figure 2:
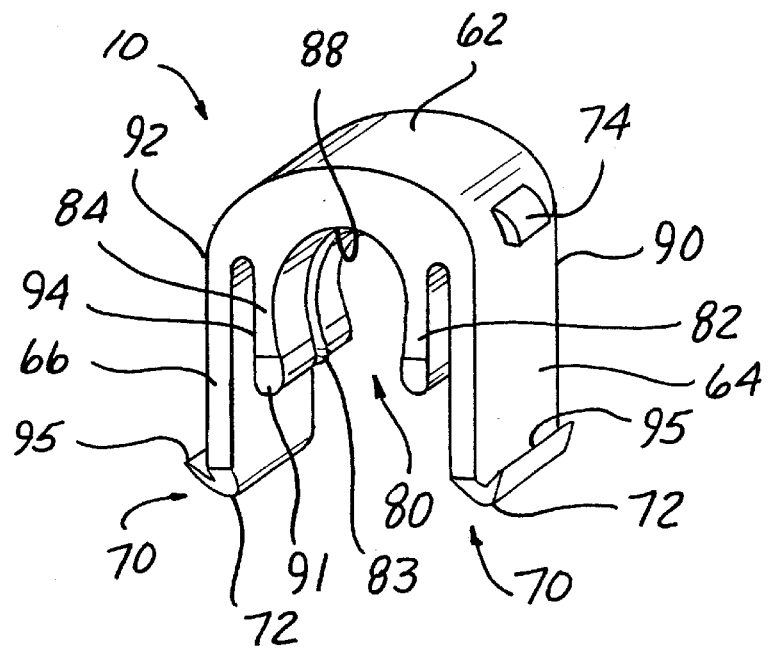
FIG. 2 is a perspective view of the retainer shown in FIG. 1.
Figure 3:
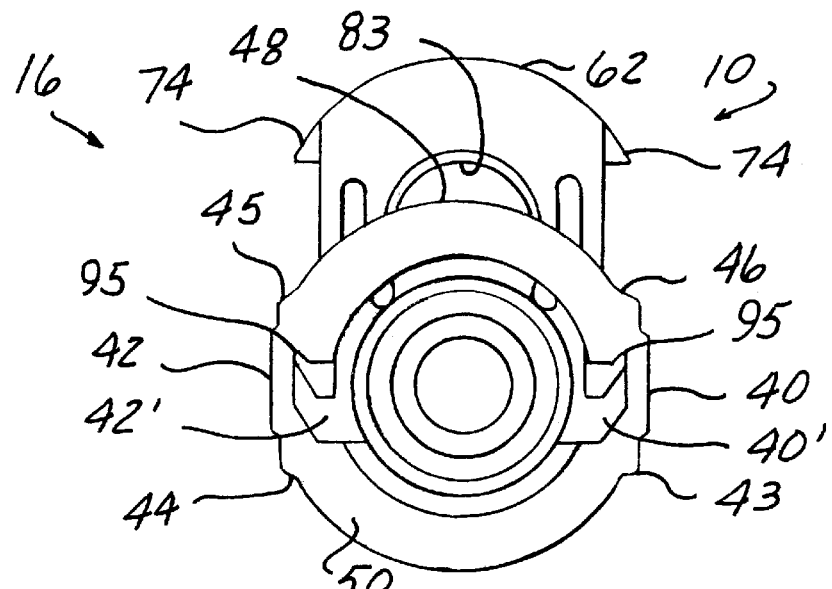
FIG. 3 is an end view of the retainer shown in FIGS. 1 and 2 depicted in a partially inserted, storage position in the connector body.

For clarity in understanding the use and operation of the present invention, reference will first be had to FIGS. 1–3 which depict one aspect of a retainer 10 which lockingly couples a connector body and an end form 12 and 14, respectively, of a fluid quick connector 16.

The following description of the body element 12 is by way of example only as the body 12 may have any suitable shape typically found in fluid quick connectors.

Further, the following description of the use of the fluid quick connector to connect tubular members will be understood to apply to the connection of conduits, hoses, and/or solid metal or plastic tubes to each other in fluid flow communication. The end of a conduit or tubular member inserted into the interior of one end of the quick connect is defined herein as an endform. The endform can be a separate member which receives a separate hose or conduit at one end or a shape integrally formed on the end of an elongated metal or plastic tube. Further, the endform can be integrally formed on or mounted as a separate element to a fluid use device, such as a pump, filter, etc., rather than as part of an elongated conduit.

Figure 5:
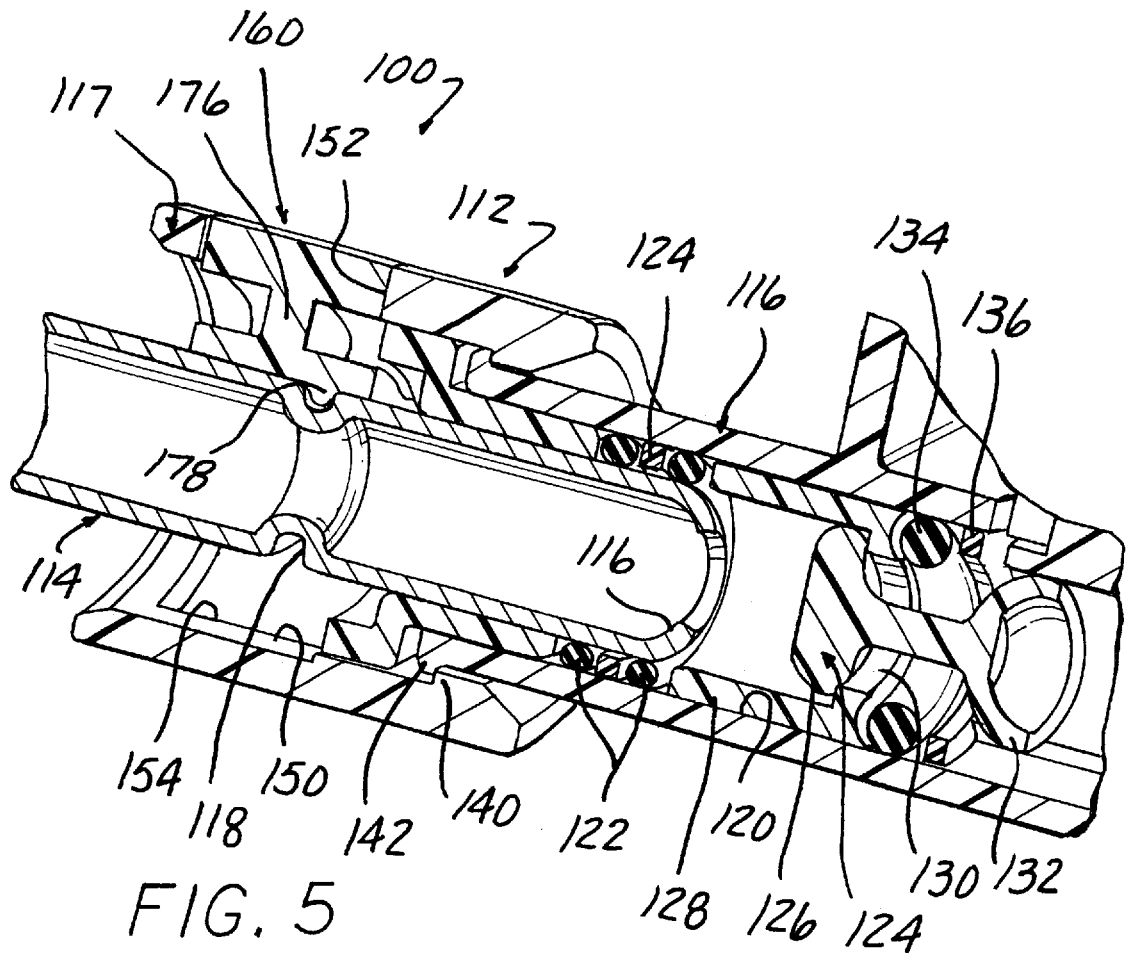
FIG. 5 is a longitudinal cross sectional view of a fluid quick connector having another aspect of a retainer and endform design according to the present invention.

The body 12 is in the form of a housing 20 having an elongated, axially extending, internal stepped bore 22, shown in detail in FIG. 5, extending from a large diameter first, open end 24 to a smaller diameter, second open end 26. The stepped bore 22 includes a first bore portion 21 extending from an opening at the first end 24 of the housing 20 to a second smaller diameter second stepped bore portion 23. A third yet smaller diameter stepped bore portion 25 extends axially from one end of the second stepped bore portion 23 and communicates to a still smaller fourth stepped bore portion 27 which extends to the open second end 26 of the housing 20.

As is conventional, a top hat or bearing 34 is mounted in the second stepped bore portion 23 immediately adjacent the end of the first bore portion 21. A seal means 30 in the form of one or two O-rings and an intermediate spacer 33 is also mounted in the second stepped bore portion 23 between one end of the top hat 34 and the third stepped bore portion 25.

The inner diameters of the seal means 30 and the top hat 34 are sized to sealingly engage the outer diameter of the end portion 11 of the end form 14. The third stepped bore portion 25 has an inner diameter sized to snugly engage the outer diameter of the end portion 11 of the male component 14 when the male component 14 is fully inserted into the stepped bore 22 as described hereafter.

Figure 4:
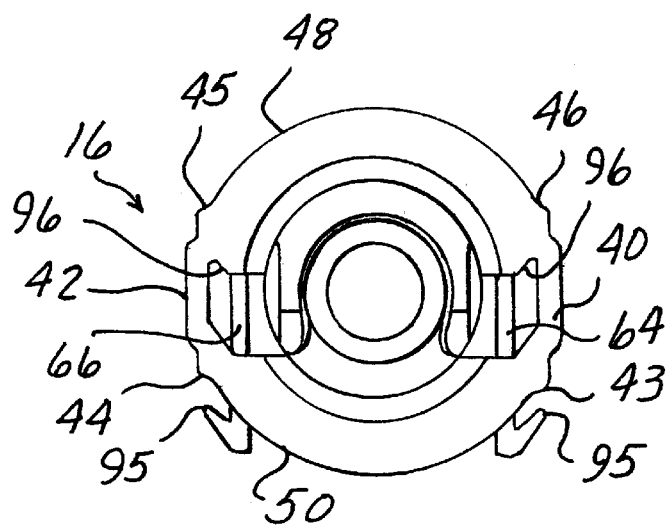
FIG. 4. is an end view of the fully engaged retainer and connector body.

As shown in FIGS. 2–4, the first end 24 of the housing 12 is formed with a pair of opposed, exterior flat surfaces 40 and 42. The flat surfaces 40 and 42 are diametrically opposed on the first end 24 and may be centrally located on each diametrical side of the first end 24. The adjacent surfaces of the housing 20 to one side of the flat surfaces 40 and 42 form an opposed pair of lock surfaces or flats, such as a first flat 43 and a second flat 44. A second pair of flats 45 and 46 are formed on the housing 12 or the other side of the flat surfaces 40 and 42. The flats 43 and 44 extend axially a short distance from the first end 24 of the housing 20. Opposed surfaces 48 and 50 of the first end 24 of the housing 20 between the flats 43 and 44 and the flats 45 and 46 have a generally arcuate shape as shown in FIGS. 3 and 4. Apertures 49 and 51 are formed respectively in each surface 48 and 50. The apertures 49 and 51 are aligned to form a transverse bore extending through the first end 24 of the housing 20 which is disposed in communication with the first bore portion 21 in the housing 20.

The retainer 10 is formed of a one-piece body of a suitable plastic, such as polyketone, for example, and has an end wall 62 formed of a generally curved or arcuate shape, by way of example only, and first and second spaced side legs 64 and 66. The side legs 64 and 66 extend generally parallel to each other from opposite ends of the end wall 62. Further, each side leg 64 and 66 has an outer end 72, although it is also possible to connect the side legs 64 and 66 at a lower portion by an arcuate member.

A pair of projections 70 extend along the length of the retainer 10 between opposed side edges of the side legs 64 and 66, respectively. The projections 70 are located adjacent the outer end 72 of each leg 64 and 66. The projections 70 engage surfaces on the housing 12 to position the retainer 10 in the shipping position not shown, or in the fully inserted, latched position shown in FIG. 3. Further, a pair of outward extending lock tabs or edges 74 are formed adjacent the end wall 62 on each side leg 64 and 66.

As shown in FIGS. 2–4, the projections 70 on the legs 64 and 66 of the retainer 10 are formed with an angled hook-like shape terminating in a tip 95. The tip 95 is disposed at an acute, upturned angle with respect to the corresponding legs 64 and 66.

The grooves 40' and 42' are formed in the interior of the flat surfaces 40 and 42, respectively, and include a recess or notch 96 at one end which is shaped complimentary to the shape of the tip 95 of the projection 70 on each of the legs 64 and 66 of the retainer 10. In this manner, pull out of the retainer 10 from the housing 12 is resisted by the interlocking tips 95 on the legs 64 and 66 of the retainer 10 which are seated within the notches 96 in the grooves 40' and 42' in the housing 12 as shown in the partially inserted, shipping position of the retainer 10. The flats or lock edges 44 and 46 are disposed at an angle complimentary to the acute angle of the tips 95 on the legs 64 and 66 of the retainer 10. This enables interlock of the tips 95 with the flats 44 and 46 resists pull out of the retainer 10 from the housing 12 from the fully latched position shown in FIG. 4.

The hook shaped tips 95 on the legs 64 and 66 of the retainer 10 in conjunction with the grooves 40' and 42' in the housing 12 also provide, a distinct, "avalanche effect" snap action of the retainer 10 in the housing 12. The grooves 40' and 42' in the housing 12 are formed in generally planar flat surfaces. The inner surfaces force the ends 72 of the legs 64 and 66 laterally inward toward each other when the retainer 10 is inserted into the housing 12. When the tips 95 clear one edge of the grooves 40' and 42', the resilient nature of the legs 64 and 66 snaps the ends 72 and the tips 95 laterally outward to create an "avalanche effect" which provides a distinct tactile feedback to the user indicating that the retainer has lockingly engaged the housing 12 in either the partially inserted position, shown in FIG. 3, or the fully inserted position shown in FIG. 4.

It should be noted that further insertion force on the retainer 10 moving the retainer 10 from the partially inserted position to the fully inserted position shown in FIG. 4 again causes the end 72 of the legs 64 and 66 to be urged laterally inward when the tips 95 of the legs 64 and 66 slide along the lower portion of the inner surfaces. When the tips 95 clear the outer end of the inner surfaces, the legs 64 and 66 spring laterally outward in a distinct "avalanche effect" manner. The lower ends of the grooves 40' and 42' are angled to enable the tips 95 to slide out of the grooves 40' and 42' toward the fully latched position.

The retainer 10 can be first be installed on the housing 12 in a shipping or storage position depicted in FIG. 3. In this position, the projections 70 on the side legs 64 and 66 of the retainer 10 snap into and engage the longitudinally extending grooves 40' and 42'.

Further insertion of the retainer 10 through the aligned apertures 49 and 51 in the housing 12 causes the ends 72 of the legs 64 and 66 to pass along the lower portion of the inner surfaces of the flat surfaces 40 and 42 until the tips 95 clear the ends of the surfaces and then snap outward exteriorly of the outer surface of the first end 24 of the housing 12 as shown in FIG. 4. In this fully inserted position of the male component 14 in the female component 12, the annular flange 18 on the male component 14 is situated ahead the arms 82 and 84 of the retainer 10. This position represents the fully latched position in which the endform 14 is fully seated in and lockingly engaged with the connector housing 12. The full insertion of the retainer 10 into the housing 12 also provides visible indication of the fully locked connection of the endform and the housing 14 and 12, respectively.

In this aspect of the invention, the retainer 10 includes an endform latch member in the form of an arcuate projection 83 extending radially inward between the arms 82 and 84. The projection 83 may have any one of a number of different cross sections, such as a smoothly curved, hemispherical shaped cross section, a squared off, polygonal cross section, etc. Further, the projection 83 may be continuous over a predetermined angular extent of the inner surface of the arms 82 and 84 of the retainer 10 or formed of a plurality of discrete, non-continuous, circumferentially aligned segments.

The arms 82 and 84 have an axial length in the illustrated view, greater than the axial length of the projections 83.

Alternately, the arms 82 and 84 and the projection 83 can be combined into a single arcuate projection with the outer surfaces spaced from the outer legs 64 and 66. Further, the projection 83 and the arms 82 and 84 can be integrally combined with the legs 64 and 66.

However, it will be understood that the cross section as well as the radial height of the projection 83 is complementary to the cross section and radial depth of the annular recess 18 formed in the end form 14. This provides releasable interlocking of the projection 83 in the recess 18 to latch the endform 14 in the housing 12 when the retainer 10 is moved into the fully latched position.

It will also be apparent that if the retainer 10 is in the fully latched position shown in FIGS. 1 and 4, prior to insertion of the endform 14 into the housing 12, the radially inward extent of the projection 83 blocks full insertion of the endform 14 into the housing 12. Likewise, the endform 14 must be fully inserted into the bore in the housing 12, as shown in FIG. 1, for the projection 83 to axially align with and engage the recess 18 in the endform 14 so as to enable the retainer 10 to be moved to the fully latched position shown in FIG. 1. If the tip end of the endform 14 is spaced from the fully inserted position in the bore in the housing 12, the projection 83 on the retainer 10 will not align with the recess 18 in the endform 14 such that the retainer 10 cannot be transversely moved into the fully latched position. When this occurs, the outer edge of the central leg 62 of the retainer 10 will extend outward from the housing 12 to provide an indication of a non-fully inserted endform 14.

Figure 6:
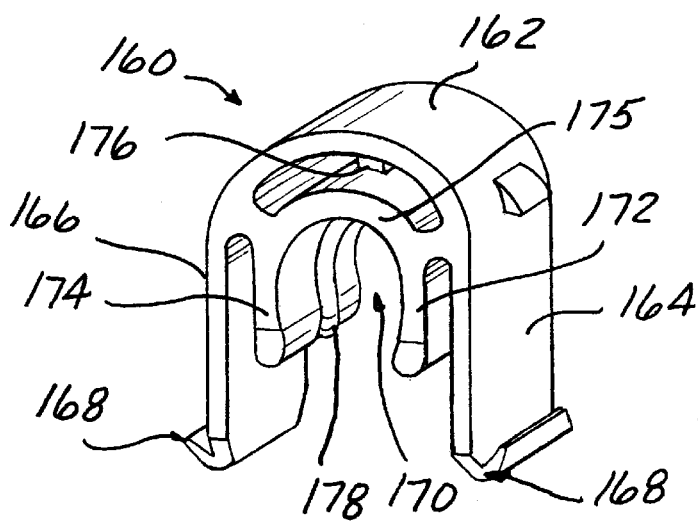
FIG. 6 is a perspective view of the retainer shown in FIG. 5.
Figure 7:
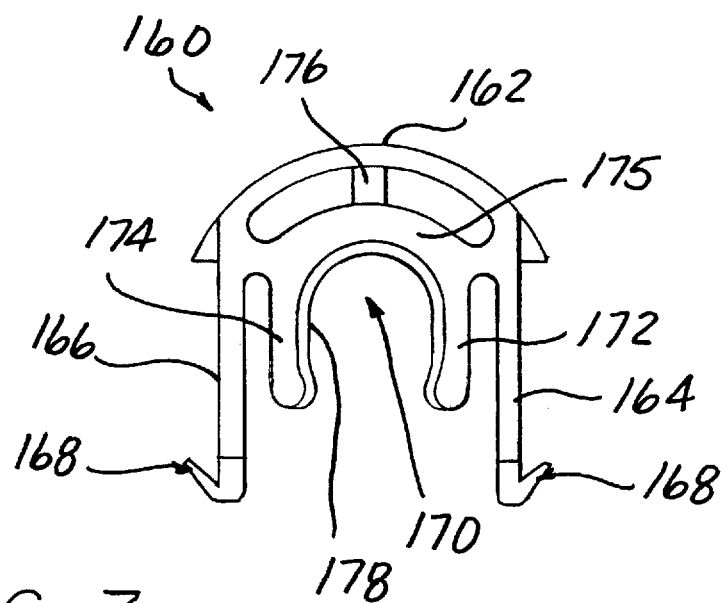
FIG. 7 is an end view of the retainer shown in FIGS. 5 and 6.

Referring now to FIGS. 5–7, there is depicted a different fluid quick connector construction which employs the same radially extending projection in the retainer which is engagable with an annular recess 18 in the male endform 14. This different quick connector construction is provided by way of example only to show the versatility of the present invention as being usable in different quick connector designs.

In this aspect of the invention, the quick connector 100 includes a housing 112 which releasably receives an endform 114 having an annular recess 118 spaced from a tip end 116. The recess 118 may have any cross sectional configuration, such a smoothly curved, hemispherical shape as shown in FIG. 5, a polygonal shape with squared off edges, etc. Further, the inner radial surface of the recess 118 is at a smaller diameter than the outer diameter of the outer surface of the endform 114.

In this aspect of the invention, the quick connector housing 112 by example only, is formed of two, rotatably disposed first and second housing portions 116 and 117. The first housing portion 116 has an axially extending, through bore 120 which receives seal elements or O-rings 112 and an intermediate spacer 124.

By example only, the first housing portion 116 is illustrated as including a check valve 124 having a first end 126 movably disposed in a sleeve 128 having a reduced diameter end aperture 130 which is sealingly closed by the first end 126 of the check valve 124. The opposed end 132 of the check valve 124 has a cup-shaped configuration which receives a biasing spring, not shown.

An O-ring seal 134 and a spacer 136 are mounted in the bore 120 adjacent the sleeve 128.

The check valve 124 is in the form of a resilient member having a stem which interconnects a generally planar first end and an inverted hemispherical, cup-shaped second end. The first end is limited in axial movement between one end of the sleeve 128. The planar first end extends diametrically across the open end of the bore in the first housing portion 116 to allow fluid flow through the end form 114 and the remainder of the through bore in the connector housing 112 to the opposite end of the housing 112.

The check valve 124 is designed to block any fluid flow from a conduit or use element attached to one end of the first housing portion 116.

A biasing spring, not shown, is mounted in the first housing portion 116 and acts on one end of the check valve 124 to bias the check valve 124 to a position in which the cup-shaped end 132 of the check valve 124 is disposed in sealing engagement with a seat formed in the first housing portion 116 to block fluid flow through the housing portion 116.

The first housing portion 116 is rotatably coupled to the second housing portion 117 by means of a radially extending, complementary flange 140 formed on one end of the first housing portion 116 and a mating, radially extending flange 142 formed on one end of the second housing portion 117. The hook-shaped flanges 140 and 142 are engagable in a snap-connection which allows rotational displacement of the first and second housing portions 116, 117 relative to each other.

The second housing portion 118 has a bore 150 extending therethrough. A pair of transverse apertures 152 and 154 are formed in the second housing portion 118 and intersect the through bore 150. The transverse apertures 152 and 154 receive a transversely movable retainer 160.

As shown in FIG. 5, and in greater detail in FIGS. 6 and 7, the retainer 160 includes a central wall 162 from which a pair of side legs 164 and 166 depend. Hook-shaped tips 168 are formed on the ends of the side legs 164 and 166 form latching engagement with exterior surfaces on the second housing portion 118 in the same manner as described above for the quick connector shown in FIGS. 1–4. The tips 168 releasably latch the retainer 160 in the second housing portion 118 in a partially inserted storage position, similar to that shown in FIG. 3 or a fully inserted latched position similar to FIG. 4.

The retainer 160 includes an endform engaging member 170 in the form of a generally U-shaped member having side legs 172 and 174 which depend from a central wall 175 attached to a rib 176 joined to the central wall 162. The inner surface of the U-shaped arms 172 and 174 is disposed at a radially inner diameter which is the same as the outer diameter of the endform 114. A projection 178 formed of one or more arcuate segments extends radially inward from an inner surface of the arms 172 and 174 to an inner diameter complementary to the inner diameter of the recess 118 in the end form 114.

The member 170 with the projection 178 can be unitarily combined with the side legs 164 and 166 as a solid member without space between the side legs 164 and 166 and the arms 172 and 174. The projection 178 on the U-shaped endform engagement member 170 has the same cross section as the recess 118 in the endform 114 for releasable engagement upon full insertion of the retainer 160 into the second housing portion 118. Due to the interfering diameters of the projection 178 and the recess 118 in the endform 114, it is clear that if the retainer 160 is in the fully inserted position shown in FIG. 4, the projection 178 will block full insertion of the endform 114 into the quick connector housing. Likewise, when the retainer 160 is in the non-latched position, see FIG. 3, the endform 114 can be inserted into the housing 112. Only when the endform 114 is fully inserted into the housing 112 such that the tip end 116 of the endform 114 engages the seals 122 and the spacer 124 disposed in the bore 120 in the first housing portion 116 will the recess 118 align with the projection 178 of the endform engagement member 170.

If the endform 114 is not fully inserted into the housing 112, the recess 118 will not align with the projection 178 such that an outer portion of the retainer 160 will extend outward beyond the outer surface of the housing 112 and the retainer 160 cannot be transversely moved into the fully latched position. This will provide a visual indication of a non-fully inserted position of the endform 114 relative to the housing 112.

In summary, there has been disclosed a fluid quick connector having a unique retainer-endform interface to releasably latch the endform in the quick connector housing. The interface includes an easily manufactured recess in the endform which is engagable by a radially inward extending projection or projections in the retainer. At the same time, the quick connector provides the required fluid quick connector functions of a full sealing of the endform in the connector housing, high pullout force retention of the endform in the housing, and a visual indication of a non-fully seated or inserted position of the endform in the housing.

What is claimed is:

1. A fluid quick connector apparatus defining a fluid joint between a conduit and a tubular endform comprising:
   a conduit
   a tubular endform having a single radially inward extending recess adjacent a first end;
   a connector body configured to axially mate with the tubular endform; and
   a retainer displaceable with respect to the connector body between a release position and an engaged position with the tubular endform, the retainer having spaced side legs latchable to the body in the retainer engaged position the retainer having spaced arms disposed inward of the side legs, the arms engagable with the endform when the retainer is moved to the engaged position, the retainer having a radially inward extending projection carried on a circumferential extent of an inner surface of the inner arms engagable with the recess in the tubular endform to effect interlocking between the connector body and the tubular endform when the retainer is in the engaged position.

2. The fluid quick connector of claim 1 wherein the recess comprises:
   a groove formed in the endform.

3. The fluid quick connector of claim 2 wherein the groove comprises:
   a radially inward end of a smaller diameter than an outer diameter of the endform.

4. The fluid quick connector of claim 1 wherein:
   the projection extends over a substantially 180° arc.

5. The fluid quick connector of claim 1 wherein the projection comprises:
   at least one arcuate segment.

6. The fluid quick connector of claim 1 wherein:
   the projection and the recess are complementary shaped.

7. The fluid quick connector of claim 1 further comprising:
   latches cooperating between the retainer and connector body to latch the retainer in the engaged position in the connector body when the endform is fully inserted into the connector body.

8. The fluid quick connector of claim 2 wherein:
   the groove extends over a substantially 180° arc.

9. The fluid quick connector of claim 2 wherein:
   the groove further includes at least one arcuate segment.

10. The fluid quick connector of claim 2 wherein:
    the projection and the recess are complementary shaped.

11. The fluid quick connector of claim 4 wherein:
    the projection and the recess are complementary shaped.

12. The fluid quick connector of claim 11 wherein:
    the projection extends over a substantially 180° arc.

13. The fluid quick connector of claim 1 wherein the retainer comprises:
    a central wall disposed between two side legs;
    a inner pair of arms disposed between the side legs adapted to engage the endform; and
    the projection carried on the inner arms.

14. A retainer for a fluid quick connector having a connector body configured to axially mate with a tubular endform having a single annular recess adjacent a first end, the retainer comprising:
    engagement members carried on the retainer adapted for displaceably mounting the retainer in the connector body in an endform latched position;
    a pair of inner arms disposed inward of the engagement members, the arms engagable with the endform; and
    an arcuate endform latch projection carried on a circumferential extent of an inner surface of the arms on the retainer adapted for engagement with the single recess in the endform to effect interlocking between the connector body and the endform when the endform is inserted into the connector body.

15. The retainer of claim 14 wherein the recess comprises:
    a groove formed in the endform.

16. The retainer of claim 14 wherein the groove comprises:
    a radially inward end of a smaller diameter than an outer diameter of the endform.

17. The retainer of claim 14 wherein:
    the projection extends over a substantially 180° arc.

18. The retainer of claim 14 wherein the projection comprises:
    at least one arcuate segment.

19. The retainer of claim 14 wherein:
    the projection and the recess are complementary shaped.

* * * * *